United States Patent Office 2,957,895
Patented Oct. 25, 1960

2,957,895

PREPARATION OF STEROIDAL Δ¹,⁴-3-KETONE COMPOUNDS USING SELENIUM DIOXIDE

Howard J. Ringold and George Rosenkranz, Mexico City, Mexico, assignors to Syntex S.A., Mexico City, Mexico, a corporation of Mexico No Drawing. Filed June 9, 1958, Ser. No. 740,549

4 Claims. (Cl. 260—397.45)

The present invention relates to a novel process for the preparation of cyclopentanophenanthrene derivatives.

More particularly the present invention relates to a novel method for the introduction of an additional double bond between the positions C–1 and C–2 of steroidal Δ⁴-3-ketones.

In our U.S. patent application, Serial No. 595,592, filed June 3, 1956, there is disclosed a process for dehydrogenating Δ⁴-3-keto steroids to prepare therefrom the corresponding Δ¹,⁴-3-keto steroids by heating with selenium dioxide in the presence of an inert organic solvent. Included among the organic solvents therein mentioned are lower aliphatic tertiary alcohols such as tertiary butyl and tertiary amyl alcohol. A similar process to that described in the aforementioned application has also been described by Szpilfogel et al., Rec. Trav. Chim., 75, 475 (1956), and Meystre et al., Helv. Chim. Acta, XXXIX, 734 (1956). The methods just referred to have at best resulted in a yield of 1-dehydro steroids of no more than 50%. In some instances where substituted compounds are involved, such as for example 6-chloro hydrocortisone dehydrogenation in accordance with the method just described gave extremely small yields of the desired 6-chloroprednisone and 6-chloro prednisolone, mainly secondary reaction products are produced.

In accordance with the present invention the surprising discovery has been that when a steroidal Δ⁴-3-ketone is dehydrogenated with selenium dioxide in a solvent comprising a lower aliphatic tertiary alcohol and further in the presence of at least a catalytic amount of pyridine the yield of the corresponding 1-dehydro steroid is greatly enhanced and in some instances becomes substantially quantitative. Thus, under the conditions of the present invention the 21-acetate of hydrocortisone has been converted into 21-acetate of prednisolone in more than 72% yield, and the acetate of the cortisone has been converted into the acetate of prednisone is over 80% yield. A further advantage of the present process is that the reaction product is substantially free of impurities and in most instances it becomes only necessary to filter the reaction mixture, concentrate it and crystallize the residue from a suitable solvent.

In practicing the process of the present invention a steroidal Δ⁴-3-ketone of the type set forth in our aforementioned U.S. patent application and preferably of the androstene or pregnene series is dissolved or suspended in a solvent, preferably a lower aliphatic tertiary alcohol such as tertiary butyl or tertiary amyl alcohol, a small amount of pyridine is added, preferably in an amount comprising from 5% to 20% of the weight of the steroid and an excess of selenium dioxide. The mixture is then refluxed, preferably under an atmosphere of nitrogen for a prolonged period of time, i.e., of the order of 12 to 96 hours. The resultant product after filtration is then worked up by conventional methods, such as extraction with an organic solvent, evaporation under reduced pressure and recrystallization from an organic solvent.

The following specific examples serve to illustrate, but are not intended to limit the present invention:

*Example I*

A mixture of 5 g. of the 21-acetate of hydrocortisone, 2.15 g. of selenium dioxide, 250 cc. of t-butanol and 0.6 cc. of pyridine was refluxed for 96 hours under an atmosphere of nitrogen and the mixture was filtered through celite. The precipitate was washed with 675 cc. of ethyl acetate and the combined filtrate and washings was concentrated to a volume of 150 cc. under reduced pressure. It was then diluted with 750 cc. of ethyl acetate, washed four times with 1500 cc. of water and the washings were re-extracted with 225 cc. each of ethyl acetate. These extracts were combined with the main fraction and evaporated to dryness under reduced pressure, avoiding overheating. The residue was dissolved in 600 cc. of acetone, mixed with 5 g. of charcoal, refluxed for half an hour, filtered and concentrated. Upon cooling of the concentrated solution there were obtained, in two crops having both a melting point between 238° and 240° C., 3.6 g. of total product.

*Example II*

A mixture of 5 g. of the 21-acetate of cortisone, 2.15 g. of selenium dioxide, 250 cc. of t-butanol and 0.6 cc. of pyridine was refluxed for 96 hours under an atmosphere of nitrogen and filtered through celite. The precipitate was washed with 675 cc. of ethyl acetate and the combined filtrate and washings was concentrated to a volume of 150 cc. under vacuum. It was then diluted with 750 cc. of ethyl acetate and the solution was consecutively washed with 500 cc. of potassium bicarbonate solution, 500 cc. of a cold ammonium sulfide solution in three portions, 500 cc. of dilute ammonium hydroxide, 500 cc. of water, 500 cc. of dilute hydrochloric acid and finally with 500 cc. of water. Each of these washings was back extracted with ethyl acetate and these extracts were combined with the main fraction of ethyl acetate.

The combined ethyl acetate solution was dried over anhydrous sodium sulfate, filtered and evaporated to dryness under reduced pressure. Crystallization of the residue from ethyl acetate furnished 4.05 g. of the 21-acetate of prednisone; the product melted between 215–220° C., resolidified upon further heating and melted again with decomposition at 228–230° C.

*Example III*

A mixture of 500 mg. of the 21-acetate of 6α-chloro-Δ⁴-pregnen-11β,17α,21-triol-3,20-dione, 25 cc. of anhydrous t-butanol, 150 mg. of selenium dioxide and 0.05 cc. of pyridine was refluxed for 70 hours under an atmosphere of nitrogen. The cooled mixture was diluted with 50 cc. of ethyl acetate and filtered through celite, washing well with ethyl acetate. The ethyl acetate solution was evaporated to dryness under vacuum and the residue was triturated with water and collected. The dry precipitate was chromatographed in a column with 25 g. of washed alumina and the crystalline fractions eluted from the column with benzene-ether and ether were combined and crystallized from acetone-hexane, thus yielding the 20-acetate of 6α-chloro-Δ¹,⁴-pregnadiene-11β,17α,21-triol-3,20-dione.

*Example IV*

A suspension of 500 mg. of the 21-acetate of 6α-chloro-Δ⁴-pregnen-17α,21-diol-3,11,20-trione in 25 cc. of pyridine was refluxed for 70 hours under an atmosphere of nitrogen. The cooled mixture was diluted with 50 cc. of ethyl acetate and filtered through celite, washing well with ethyl acetate. The ethyl acetate solution was evaporated to dryness under vacuum and the residue was triturated with water and filtered. The dry precipitate was chromatographed in a column with 25 g. of washed alumina and the crystalline fractions eluted with benzene-ether and ether were combined and crystallized from acetone-hexane, thus yielding 105 mg. of the 21-acetate of 6α-chloro-$\Delta^{1,4}$-pregnadien-17α,21-diol-3,11,20 - trione with M.P. 217–219° C., max., 238 mμ, log 4.18.

*Example V*

Following the procedure of Example I, the following $\Delta^4$-3-ketones were converted to the corresponding $\Delta^{1,4}$ compounds, testosterone to $\Delta^{1,4}$-androstadien-17β-ol-3-one, testosterone acetate to acetate of $\Delta^{1,4}$-androstadien-17β-ol-3-one, Reichstein's "S" to $\Delta^{1,4}$-pregnadien-17α,21-dione and $\Delta^4$-androsten-3,17-dione to $\Delta^{1,4}$-androstadien-3,17-dione.

We claim:

1. A process for the preparation of steroidal $\Delta^{1,4}$-3-ketone compounds which comprises refluxing the corresponding steroidal $\Delta^4$-3-ketone compounds selected from the class consisting of $\Delta^4$-3-keto compounds of the pregnene series and $\Delta^4$-3-keto compounds of the androstene series with an excess of selenium dioxide in the presence of a tertiary lower aliphatic alcohol solvent and pyridine in an amount of from 5 to 20% of the weight of the steroid.

2. The process of claim 1 wherein the alcohol is t-butanol.

3. The process of claim 2, wherein the starting material is 21-acetate of cortisone and the product is the 21-acetate of prednisone.

4. The process of claim 1 wherein the starting material is the 21-acetate of hydrocortisone and the final product is the 21-acetate of prednisolone.

References Cited in the file of this patent

Szpilfogel: Rec. Trav. Chim., May 1956, 75, pages 475–480.

Meystre: Helv. Chim. Acta, May 1956, 39, page 734.

Ringold: J. Org. Chem., February 1956, 21, pages 239–240.